United States Patent [19] [11] 4,003,113
Bulloch, Jr. [45] Jan. 18, 1977

[54] METHOD OF FORMING A SPRING CUSHION CONSTRUCTION

[76] Inventor: Carl Gordon Bulloch, Jr., 31 Kingwood Place, Asheville, N.C. 28804

[22] Filed: May 5, 1975

[21] Appl. No.: 574,598

Related U.S. Application Data

[60] Division of Ser. No. 478,618, June 12, 1974, Pat. No. 3,906,560, which is a continuation-in-part of Ser. No. 298,953, Oct. 19, 1972, Pat. No. 3,818,560, which is a division of Ser. No. 130,328, April 1, 1971, Pat. No. 3,719,963.

[52] U.S. Cl. .............. 29/91.1; 264/45.5; 264/46.7; 264/DIG. 14
[51] Int. Cl.² ............ B68G 7/00; B29D 3/00
[58] Field of Search ........... 29/91.1; 5/351, 354, 5/361; 264/46.4, 46.7, 46.9, 46.5, 54, DIG. 14, 45.5

[56] References Cited

UNITED STATES PATENTS

| | | | |
|---|---|---|---|
| 2,816,852 | 12/1957 | Banks | 214/46.4 X |
| 2,827,661 | 3/1958 | Von Kohern | 264/DIG. 14 |
| 3,005,213 | 10/1961 | Brown et al. | 264/54 |
| 3,142,073 | 7/1964 | Stern | 5/354 |
| 3,204,016 | 8/1965 | Sanger | 264/46.7 |
| 3,334,557 | 8/1967 | Fitzgibbon | 264/46.5 X |
| 3,459,611 | 8/1969 | Joseph et al. | 5/351 X |
| 3,719,963 | 3/1973 | Bulloch, Jr. | 5/351 |

Primary Examiner—Leon Gilden
Attorney, Agent, or Firm—Bell, Seltzer, Park & Gibson

[57] ABSTRACT

A method of forming a spring cushion construction comprising a foamed pad having a generally flat inner surface with a depending peripheral edge, the flat inner surface including a dense outer crust. A spring assembly is disposed so that the terminal face portions thereof contact the outer crust and with the depending edge of the pad confiningly receiving the spring assembly to prevent lateral displacement therebetween. The pad is formed by a method which includes foaming a foamable material in an open top mold while leveling the upper surface of the foamable material in a manner which does not interfere with the formation of a dense outer crust thereon. The depending foam edge may then be formed by adding additional foamable material along the periphery of the pad, or by suitably attaching a preformed foam strip therealong.

18 Claims, 28 Drawing Figures

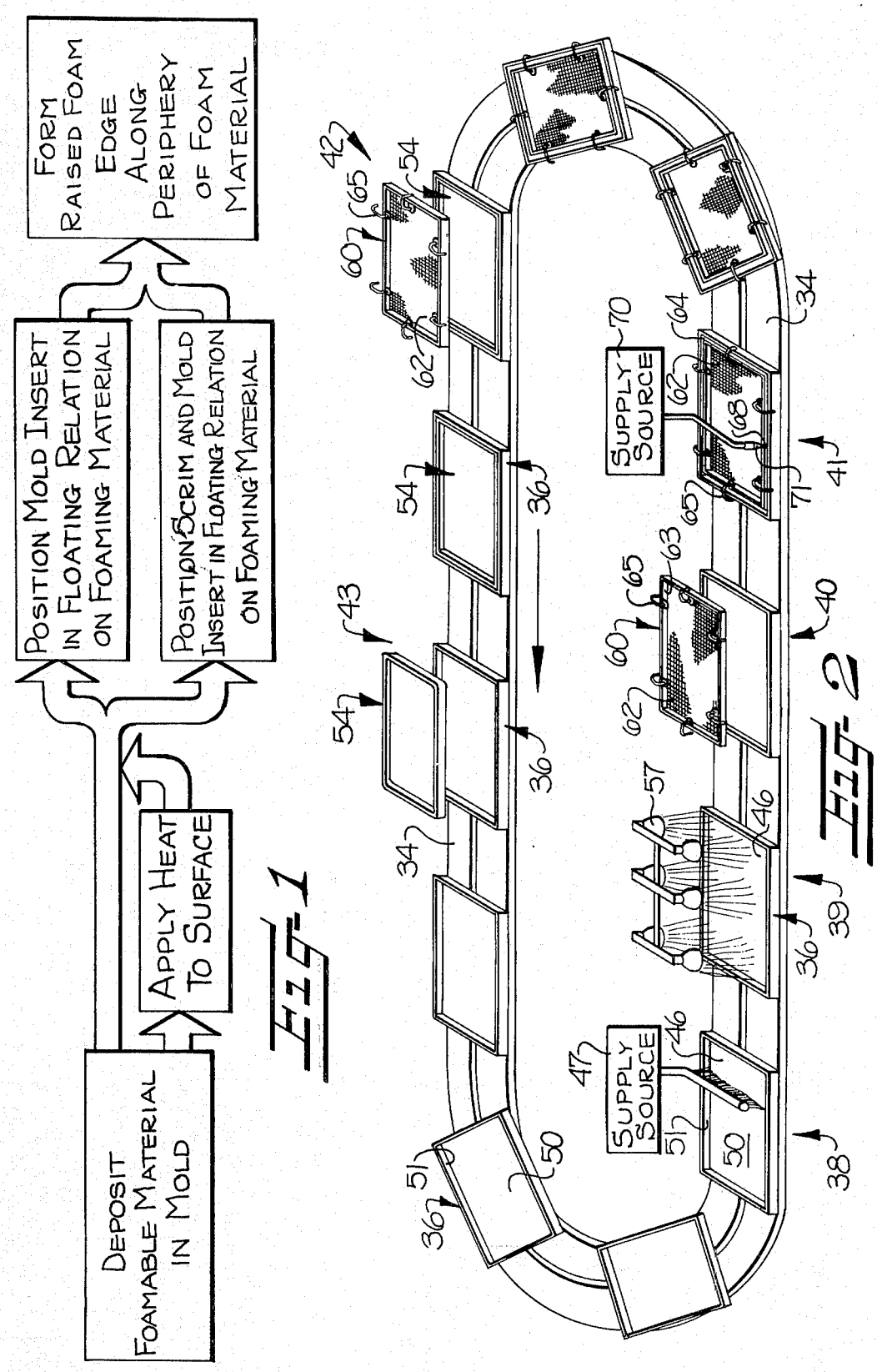

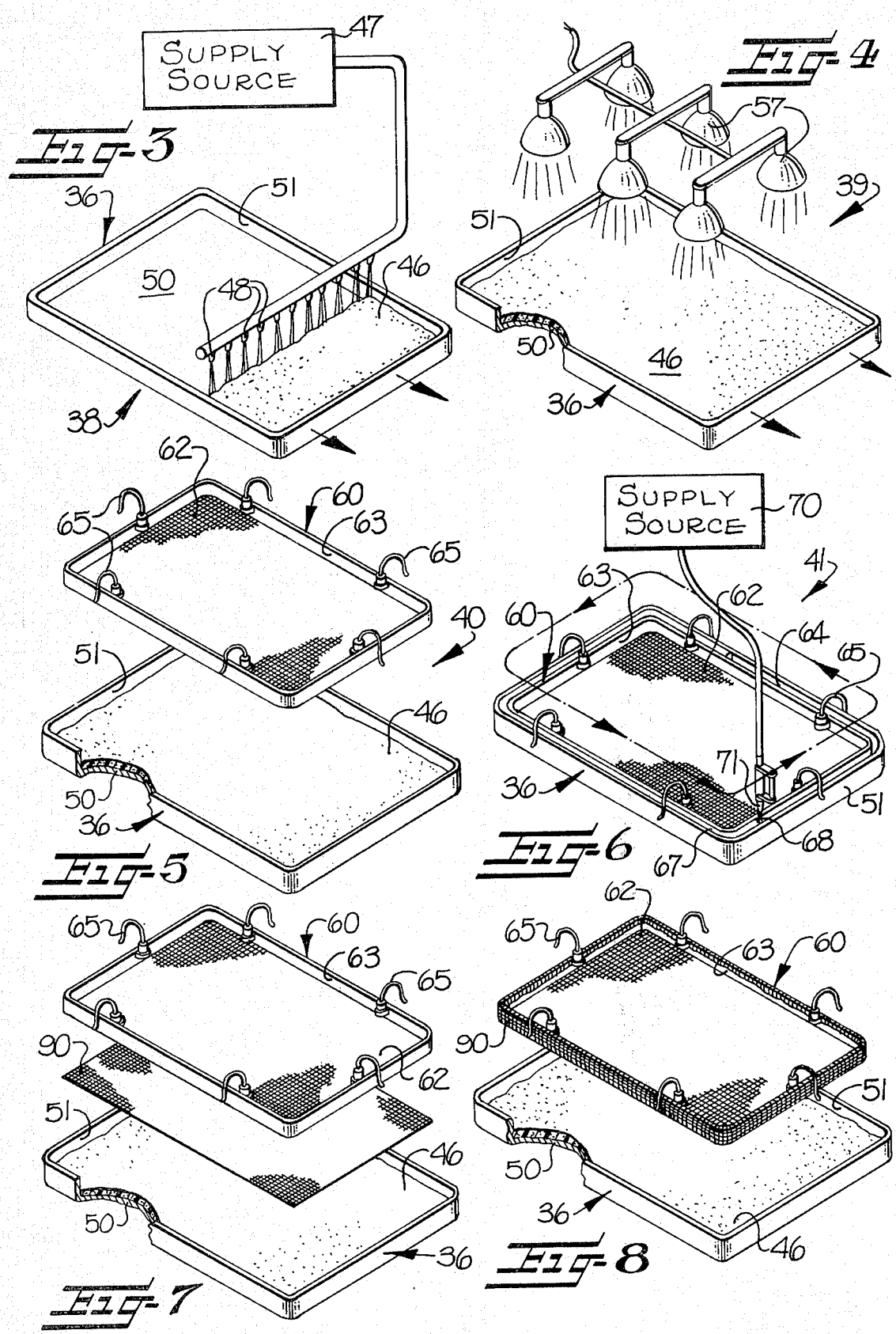

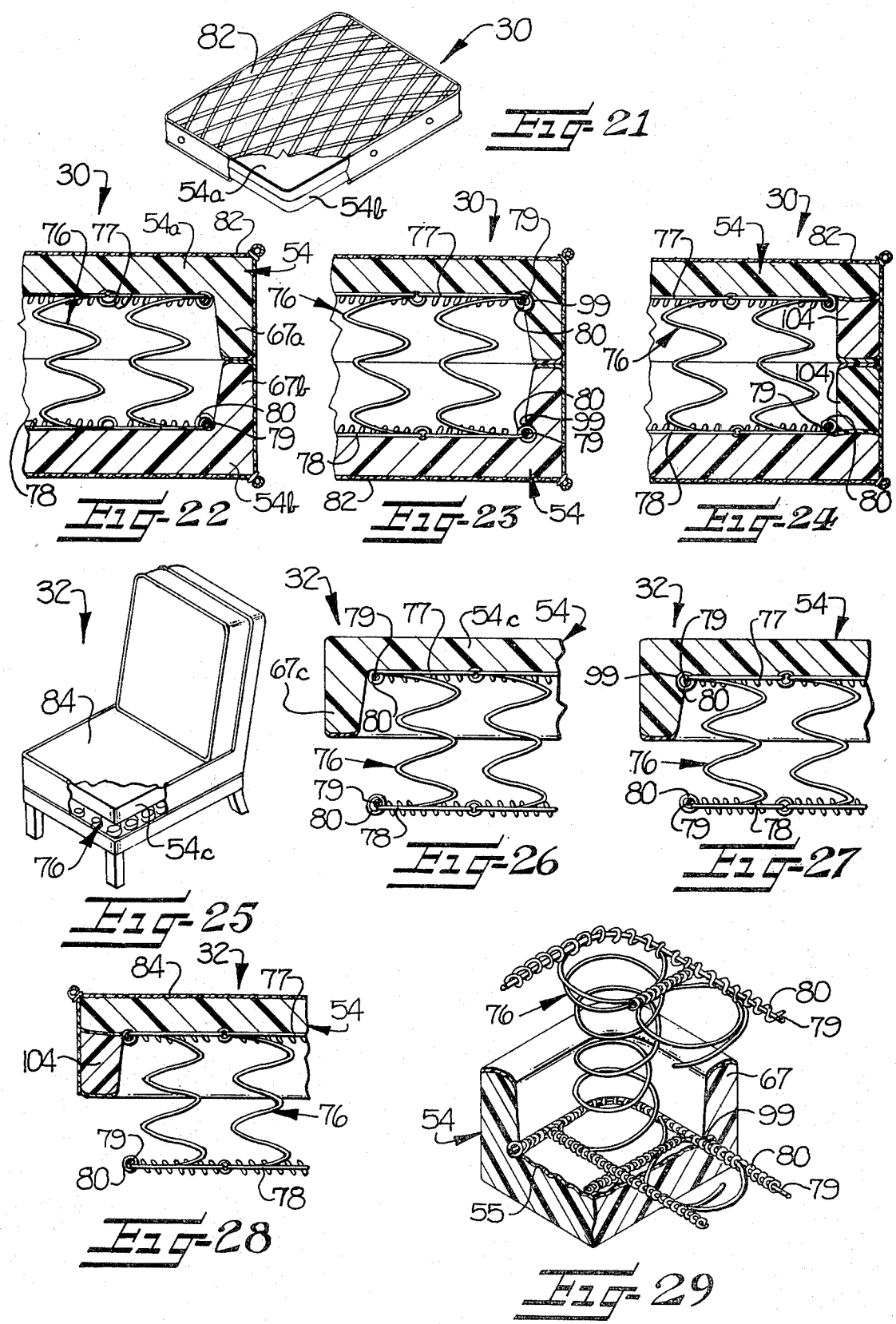

METHOD OF FORMING A SPRING CUSHION CONSTRUCTION

The present application is a division of my copending application Ser. No. 478,618, filed June 12, 1974, now U.S. Pat. No. 3,906,560, is a continuation-in-part of application Ser. No. 298,953, filed Oct. 19,1972, now U.S. Pat. No. 3,818,560, and which in turn is a division of application Ser. No. 130,328, filed Apr. 1, 1971 and now U.S. Pat. No. 3,719,963.

The present invention relates to a method of forming a spring cushion construction for use as a seat, mattress, or the like and which comprises an outer foam pad and an underlying spring assembly.

Conventionally, seat cushions of the described type are fabricated by mechanically attaching a preformed pad to an underlying spring assembly. In an attempt to prevent the springs from gradually cutting their way through the foam during use and thereby destroying the cushion, it is common to also place a fabric insulator between the springs and foam. The use of such an insulator is not altogether satisfactory, however, since it adds to the cost of the resulting product, and the relative movement between the foam and terminal portions of the spring assembly during use tends to break down the insulator thereby permitting the spring assembly to enter and cut through the foam.

It has also been proposed to fabricate foam cushions by employing a foamable elastomeric material which is adapted to form a dense outer crust along the upper surface when foamed in an open top mold, and wherein the foam rises within the mold during the foaming process to embed the terminal portions of a spring assembly being held above the mold such that the crust serves to "lock" the springs in the foam, note for example the U.S. Pat. Nos. to Koenigsberg, Re. 24,914 and Brown et al, 3,005,213. However, such method results in the foam pad and spring assembly being initially interconnected, and it is often desirable to separately fabricate the foam cushion and subsequently interconnect the spring assembly to reduce shipping and handling costs. Also, this latter practice has not heretofore been feasible when the pad is formed in an open top mold since the upper surface which includes the dense upper crust tends to become somewhat rounded or crowned. This characteristic is particularly pronounced when a relatively large pad such as would be used in a mattress is fabricated, and the existence of the crowned surface effectively precludes the subsequent positioning of a spring assembly against the upper surface since the pad would not lie flat on the spring assembly and the central portion of the pad would be of greater thickness than the peripheral portions.

It is accordingly an object of the present invention to provide a method of forming a spring cushion construction of the described type which eliminates the need for a conventional insulator.

It is another object of the present invention to provide a method of forming a foam pad for use in a spring cushion construction and wherein the pad has a generally flat outer surface including a dense outer crust capable of preventing penetration by an adjacent spring assembly during prolonged use.

It is another object of the present invention to provide a method of forming a foam pad having a peripheral depending edge portion which is adapted to confiningly receive a spring assembly within the bounds thereof to facilitate interconnection of the foam pad and spring assembly, and prevent lateral shifting therebetween.

It is also an object of the present invention to provide a method of forming an inner spring mattress comprising a pair of opposing foam pads of the above construction with a spring assembly positioned therebetween.

It is still another object of the present invention to provide a method of forming a foam pad which includes foaming a foamable material in an open top mold, and wherein a major portion of the upper surface may be leveled during the foaming operation to thereby provide a relatively flat area for contacting an adjacent spring assembly.

It is a further object of the present invention to provide a method of forming a foam pad in an open top mold and wherein the upper surface is leveled during the foaming operation without significantly interfering with the formation of a dense upper crust.

It is also an object of the present invention to provide a method of forming a foam pad having a raised edge along the periphery of the upper surface which is adapted to confiningly receive an adjacent spring assembly.

These and other objects and advantages of the present invention are achieved in the embodiments of the present invention illustrated herein by the provision of a spring cushion construction which comprises a foamed pad having a generally flat inner surface and a depending peripheral edge. (The edge is generally referred to herein as "raised" when described in association with the method of the present invention, and as "depending" when described in association with the product since the pad is typically viewed as being inverted when assembled to the spring assembly.) The flat inner surface includes a dense outer crust, and a spring assembly is positioned so that the terminal face portions thereof contact the outer crust without significantly penetrating the same so that the crust serves as an insulator to prevent the spring assembly from penetrating into the interior of the pad during use. Also, the depending edge confiningly receives the spring assembly within the bounds thereof such that the edge serves to prevent lateral shifting between the spring assembly and pad.

The above cushion construction is fabricated by a method which includes foaming an elastomeric material in an open top mold so as to form a dense upper crust thereon, and leveling the upper surface during the foaming operation by positioning an openwork mold insert in floating relation thereon, the openwork nature of the insert serving to maintain a substantial portion of the foaming material in contact with the air to thereby result in the formation of the dense upper crust. A raised foam edge may then be formed by depositing additional foamable material in a channel formed between the mold and mold insert.

Some of the objects of the invention having been stated, other objects will appear as the description proceeds, when taken in connection with the accompanying drawings, in which -

FIG. 1 is a flow chart illustrating the steps of a method of making a foam pad and embodying the present invention;

FIG. 2 is a schematic illustration of an apparatus adapted to carry out the method illustrated in FIG. 1;

FIG. 3 is a schematic illustration of the initial step in the method illustrated in FIG. 1;

FIG. 4 is a schematic illustration of the subsequent step of applying heat to the surface of the foaming material;

FIG. 5 is a schematic illustration of the subsequent step of positioning a mold insert on the foaming material;

FIG. 6 is a schematic illustration of the subsequent step of forming a raised foam edge along the periphery of the foam material by positioning additional foamable material in the channel formed between the mold insert and mold;

FIG. 7 is a view similar to FIG. 5, but illustrating an alternate embodiment wherein the mold insert and an open mesh scrim fabric are positioned on the foaming material;

FIG. 8 is a view similar to FIG. 7, but illustrating another embodiment wherein an open mesh scrim fabric is presecured to the mold insert prior to being positioned on the foaming material;

Figure 10:
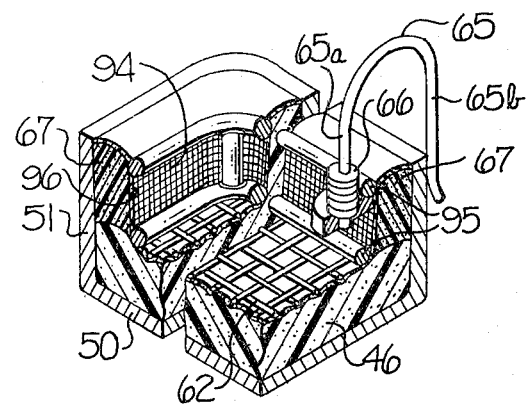
FIG. 10 is a sectioned perspective view illustrating another embodiment wherein the upstanding flange of the mold insert comprises a relatively fine, openwork screen.
Figure 12:
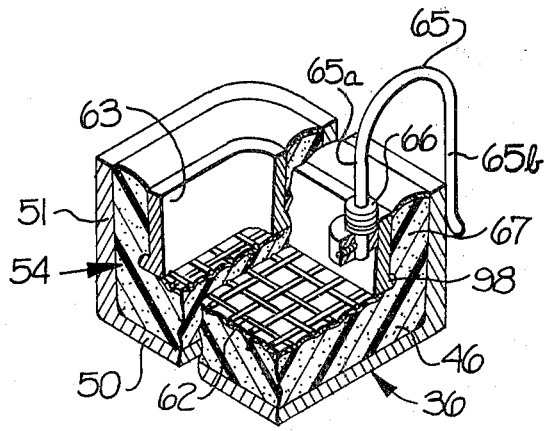
FIG. 12 is a sectioned perspective view illustrating another embodiment wherein the upstanding flange of the mold insert includes a laterally directed peripheral rib for forming a channel along the inwardly facing surface of the raised edge.
Figure 13:
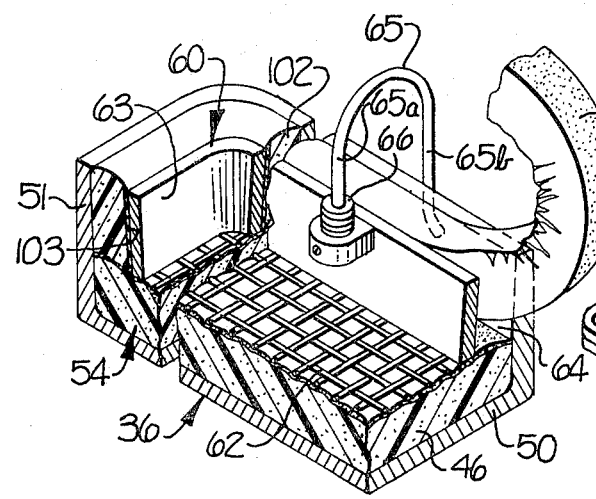
FIG. 13 is a schematic illustration of an alternate method for forming a raised edge along the periphery of the foam pad by positioning a strip of foamed material in the channel formed between the mold and mold insert.
Figure 14:
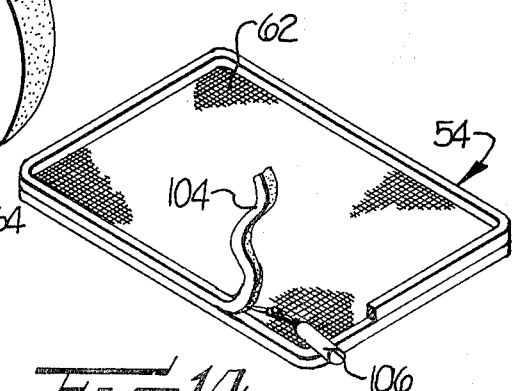
Figure 15:
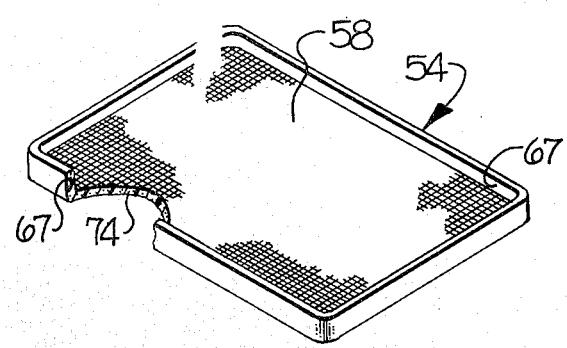
Figure 16:
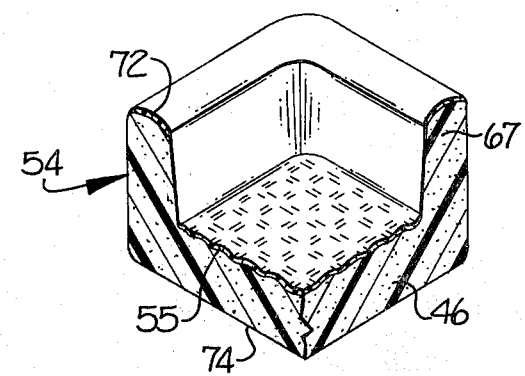
Figure 17:
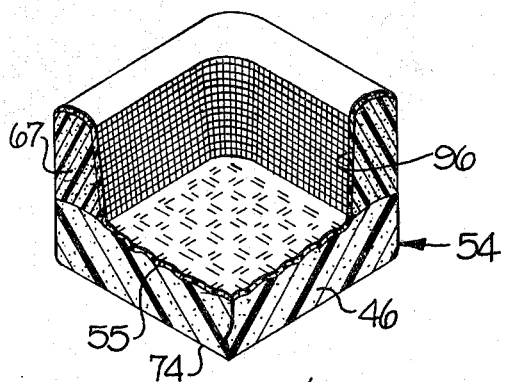
Figure 18:
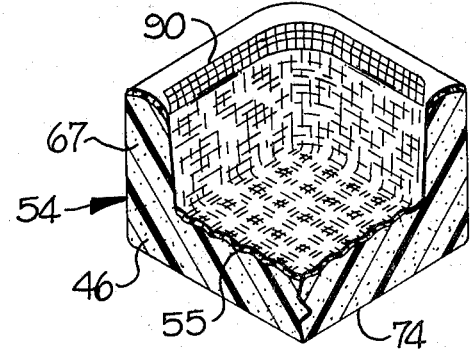
Figure 19:
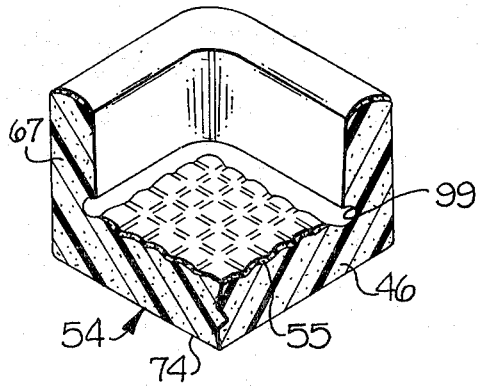
Figure 20:
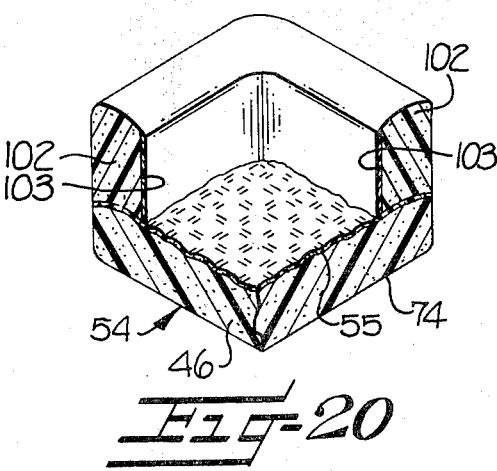

FIG. 14 schematically illustrates another embodiment of a method for forming a raised edge and wherein a strip of foamed material is secured to the pad after removal from the mold;

FIG. 15 is a perspective view, partly broken away, illustrating a foam pad embodying the features of the present invention;

FIG. 16 is a sectioned perspective view of the pad illustrated in FIG. 15;

FIG. 17 is a sectioned perspective view similar to FIG. 16, but illustrating an embodiment resulting from the use of a mold insert as shown in FIG. 10 and wherein a crust is formed on the inwardly facing surface of the raised foam edge;

FIG. 18 is a sectioned perspective view similar to FIG. 16, but illustrating another embodiment resulting from the use of a mold insert as shown in FIG. 8 and wherein a reinforcing open mesh scrim fabric is embedded in the crust of the flat central portion of the pad and the inwardly facing surface of the raised foam edge;

FIG. 19 is also a view similar to FIG. 16 but illustrating a foam pad resulting from the use of a mold insert as shown in FIG. 12;

FIG. 20 is a sectioned perspective view of a foam pad resulting from the method illustrated in FIG. 13;

FIG. 21 is a perspective view, partly broken away, of an inner spring foam mattress which embodies the present invention;

FIG. 22 is a fragmentary sectional view of an inner spring foam mattress which embodies the present invention;

FIG. 23 is a view similar to FIG. 22 wherein the pads of the mattress include a peripheral channel adapted to receive the border wire of the spring assembly;

FIG. 24 is a view similar to FIG. 22 but illustrating the embodiment wherein the raised edge is separately formed from the remainder of the pad and attached as shown in FIGS. 13 or 14;

FIG. 25 is a perspective view, partly broken away, of a seat cushion which embodies the present invention;

FIG. 26 is a fragmentary sectional view of a seat cushion which embodies the present invention;

FIG. 27 is a view similar to FIG. 26 and illustrating the embodiment wherein the foam pad includes a peripheral channel for receiving the border wire of the spring assembly;

FIG. 28 is a view similar to FIG. 26 and illustrating the embodiment wherein the raised edge is separately formed from the remainder of the pad; and FIG. 29 is a fragmentary perspective view of an inverted foam pad and spring assembly of the construction illustrated in FIG. 27.

Referring more specifically to the drawings, FIGS. 1 and 2 schematically illustrate a process and apparatus for fabricating a foam pad adapted for use in an inner spring mattress 30 as shown in FIG. 21, or in a seat cushion 32 as shown in FIG. 25. According to the illustrated embodiment, the method is carried out on an apparatus which comprises an endless horizontal trackway 34 of conventional construction and which is adapted to convey a number of open top molds 36 thereabout. More particularly, the trackway 34 sequentially conveys each open top mold 36 past a mold filling station 38, a heating station 39, an insert assembly station 40, an edge forming station 41, an insert removal station 42, and a pad removal station 43.

Viewing first the mold filling station 38 as seen in FIGS. 2 and 3, a predetermined quantity of a foamable material 46 is fed from a suitable source of supply 47 and sprayed or otherwise deposited in the open top mold 36 through a number of nozzles 48 or the like. The mold 36 is typically constructed from a lightweight material such as aluminum, and comprises a generally flat bottom wall 50 and a raised peripheral edge wall 51 which defines a generally rectangular peripheral outline.

After the foamable material 46 is received in the mold, the evolution of carbon dioxide or other blowing agent causes the material to expand and rise within the mold to form a foamed cellular elastomeric pad 54 (FIG. 15) as hereinafter further described. In addition, it is a characteristic of the ingredients of the foamable material employed with the present invention that tough dense outer crust 55 (best seen in FIG. 16) is formed along the upper surface of the pad during the foaming process. The exact reasons for the formation of this crust are not fully understood, but it is believed that the formation is dependent upon contact with the atmosphere since a crust of this type is not formed along the bottom and side walls of the pad which are in contact with the mold surfaces. Typically, the crust has a thickness of about 1/16 inch, although in accordance with the present invention, the thickness may be substantially increased. More particularly, the thickness of the crust may be increased to a thickness substantially greater than 1/16 inch, such as about ⅛ inch, by heating the upper surface of the foaming material with infrared lamps 57 at the heating station 39.

As noted above, it is a characteristic of the described foamable material to form a rounded or crowned upper surface during the foaming operation. In accordance with the present invention, at least a major portion of the upper surface is leveled during the foaming operation to define a substantially level central portion 58 in the resulting pad 54, and this leveling operation is performed while maintaining a substantial portion of the central portion 58 in contact with the surrounding air to thereby result in the dense upper crust 55 being formed thereon. The above functions are achieved in the illustrated embodiment by the use of an openwork mold insert 60 which is positioned on the upper surface of the foaming material 46 so as to be floatingly carried thereon.

The insert 60 is typically fabricated from a suitable metallic material such as aluminum and comprises a generally flat openwork member 62 and an upstanding imperforate flange 63 surrounding the member. The flange 63 thereby defines a peripheral border extending above the plane of the member 62, and the border generally conforms to the rectangular peripheral outline of the mold 36 such that the mold insert is adapted to be positioned within the mold and spaced a substantially uniform distance from the peripheral edge wall 51 of the mold to thereby define a relatively narrow, open channel 64 therebetween.

The member 62 may be composed of a screen of uniform construction formed in any suitable manner, such as by interlacing strands of material such as metal wire. Alternately, the screen could take the form of a conventionally formed expanded metal member. By design, the member 62 is composed primarily of open area, e.g., at least about 75%, to permit air to reach a substantial portion of the underlying upper surface and thereby permit the formation of a crust 55 thereon. As shown, the member 62 comprises a screen formed of woven wire fabric (note FIG. 9), and typically the wires of the fabric have a diameter of about 1/16 inch and the openings are between about ⅜ to ½ inch square. Thus, the wires of the screen overlie a relatively small part of the area of the central portion, and the development of the crust 55 is not significantly retarded by the presence of the mold insert.

Figure 9:
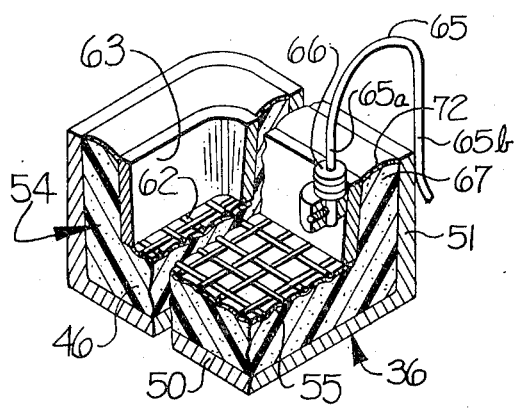
FIG. 9 is a sectioned perspective view illustrating the mold, mold insert, and resulting pad as seen in FIG. 6.

As seen for example in FIGS. 5, 6 and 9, the mold insert includes a number of arcuately curved handles 65 carried along the flange 63. More particularly, the handles 65 are of a generally inverted U-shaped configuration, with the inner leg 65a being attached to the inwardly facing edge of the flange 63, and the outer leg 65b serving as a cam for engaging the outer edge of the wall 51 of the mold. By this arrangement, the insert may be conveniently lifted by the workmen, and guidingly centered within the peripheral outline of the mold such that the mold insert is free to rise upwardly with the foaming material while being maintained in its centralized location with respect to the mold. Further, a number of weights 66 in the form of cylindrical washers are adapted to be selectively positioned on the insert 60 by threading the same onto the handles in a manner apparent from FIGS. 5 and 9. Thus the weight of the insert may be varied to control the height and density of the resulting pad, and under certain conditions it is possible that the insert will remain substantially at its initial elevation and will prevent the rising of the foam.

It is a further aspect of the present invention to form a raised foam edge 67 along the periphery of the upper surface of the pad, the raised edge being designed to confiningly receive a spring assembly within the bounds thereof in a manner further described below. As illustrated in FIG. 6, additional foamable material 68 may be deposited in the open channel 64 between the edge wall 51 of the mold and the flange 63 of the mold insert to form the raised edge 67. By this arrangement, the additional foamable material 68 rises within the channel 64 and self-adheres to the upper surface of the underlying material 46 to form the raised edge 67.

The additional foamable material 68 may be deposited by an arrangement which includes a supply source 70, and a movable nozzle 71 operatively connected to the supply source. The nozzle 71 may be movable by hand, or a mechanism of suitable design (not shown) may be provided for automatically translating the nozzle 71 along the channel 64. Also, while it is generally preferred to add the additional foamable material immediately after positioning the mold insert on the underlying material 46, it should be understood that this step may be conducted after the foaming operation of the underlying material 46 is substantially completed since the additional material 68 readily self-adheres to the crust which would be formed on the underlying material. Also, as seen for example in FIGS. 9 and 16, a crust 72 is formed along the upper surface of the edge 67. While the additional foamable material 68 is typically of a composition similar to that of the initial material 46, the additional material may, if desired, be selected to produce a somewhat higher density foam and thus provide increased rigidity and resistance to penetration by the spring assembly.

When the foaming process for both the underlying material 46 and additional material 68 is substantially completed, the mold insert 60 is removed from the resulting pad 54 at station 42. The pad 54 is then stripped from the mold at station 43. In this regard, it will be understood that the mold insert 60 may be coated with a conventional release agent, such as wax, Teflon or silicone to prevent adherence to the crust 55, and the mold 36 may be similarly coated to facilitate removal of the pad therefrom. Also, it will be understood that the pad and mold insert could be initially removed from the mold as a unit, and the pad then stripped from the insert.

As best seen in FIGS. 15–16, the resulting pad 54 comprises a generally flat bottom or outer surface 74, and an inner surface comprising the generally flat central portion 58 and the raised edge 67. The central portion 58 will be seen to have a gridwork of indentations therein resulting from the wires of the screen 62 of the mold insert. The pad 54 is thus in a form which may be conveniently shipped or stored prior to being interconnected with a spring assembly, or alternatively, the pad may be immediately joined to the spring assembly.

Where the pad 54 is to be employed in the fabrication of an inner spring mattress 30 as seen in FIGS. 21 – 24, a spring assembly 76 is disposed intermediate two substantially identical pads 54a, 54b, the pad 54a being inverted so that they are disposed in an adjacent, parallel relationship with the inner surfaces facing each other. The spring assembly 76 itself is generally conventional, and includes generally flat upper and lower terminal face portions 77, 78, respectively, with each face portion contacting the central portion of the associated pad such that the outer crust serves as an insulator to prevent the terminal face portions from penetrating into the interior of the pads during use. Also, each face of the spring assembly includes a relatively heavy peripheral border wire 79 having a smaller helical wire 80 disposed thereabout. The spring assembly has an overall configuration generally conforming to that of the central portion of each pad such that it is confiningly received within the bounds of the depending edges 67a, 67b of the pads whereby the depending edges serve to prevent lateral shifting between the spring assembly and pads. To maintain the spring assembly in assembled relation with the pads, there is further provided a fabric covering 82 in the form of a mattress ticking which completely surrounds the assembled spring assembly and pads. Also, it will be noted that the edges 67a, 67b of the pads substantially contact each other to provide additional firmness along the periphery of the mattress where a user commonly sits.

The pad 54 of the present invention is also adapted for use in the fabrication of a seat cushion 32 as shown in FIGS. 25 – 28. As illustrated in FIG. 26, a single pad 54c is joined to one side of a spring assembly 76 such that the terminal face portions 77 of the spring assembly contact the outer crust of the pad 54c in the manner described above. Here again, the spring assembly 76 has an overall configuration so as to be confiningly received within the bounds of the depending foam edge 67c so as to prevent lateral shifting between the spring assembly and pad. To maintain the spring assembly and pad in assembled relation, a fabric covering 84 (FIG. 25) may be employed to join the same to the frame of the seat, or a suitable adhesive may be used.

In the embodiment of the invention illustrated in FIG. 7, an open mesh fabric 90 or scrim is initially positioned on the foaming material 46 so as to be floatingly carried thereon and underlie the mold insert 60. By this arrangement, the mesh fabric 90 becomes essentially embedded in the upper crust to thereby reinforce the same. The fabric 90 is generally conventional, and may for example comprise four by four cotton mesh fabric (defined as having four openings per inch in each of the two transverse directions), or five by five cotton mesh fabric.

Figure 11:
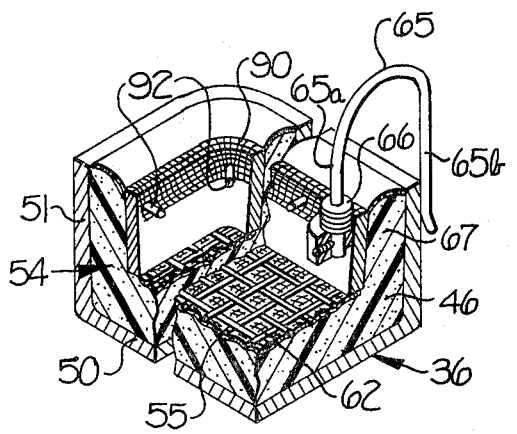
FIG. 11 is a sectioned perspective view illustrating the embodiment shown in FIG. 8 and wherein the open mesh scrim fabric is presecured to the mold insert.

In order to facilitate the placement of the mesh fabric 90 on the foaming material 46, the fabric may be presecured to the lower surface of the mold insert 60 such that the fabric and insert are positioned on the foaming material substantially concurrently, note FIGS. 8 and 11. In this embodiment, a plurality of spaced pins 92 are positioned along the inwardly facing surface of the flange 63 of the insert so that the fabric 90 may be drawn over the top of the flange and secured to the pins in the manner best seen in FIG. 11. When the foaming of the material is completed, the fabric is released from the pins 62, and the insert removed. This results in the pad as shown in FIG. 18 wherein the mesh fabric is embedded in the crust 55 along the central portion, and along the inwardly facing surface of the raised edge 67. In this arrangement, the fabric 90 not only reinforces the crust, but also serves to prevent the spring assembly from cutting laterally into the raised edge of the pad.

Another embodiment of the present invention is illustrated in FIGS. 10 and 17 wherein the flange of the mold insert comprises a relatively fine, openwork screen 94 supported by a framework of interconnected rods 95. The screen 94 is adapted to permit air to pass therethrough and contact the inside surface of the foamable material deposited in the open channel, to thereby permit the formation of a dense crust 96 on the inwardly facing surface of the resulting raised edge. In this regard, the fineness of the screen 94 should be correlated to the viscosity of the foamable material deposited in the open channel such that the foamable material will not penetrate the screen. For typical foamable materials, the screen should be of a fineness comparable to ordinary household window screening. FIGS. 10 and 17 further illustrate the above described condition wherein the foamable material 68 added to form the raised edge produces a higher density foam than the initial foamable material 46.

As seen in the embodiment illustrated in FIG. 12, the mold insert includes a laterally directed peripheral rib 98 which extends along the lower edge of the flange 63 and into the channel 64. The rib thus lies substantially coplanar with the screen 62, and is adapted to form a peripheral channel 99 along the base of the inwardly facing surface of the raised foam edge as seen in FIG. 19. As will become apparent, the channel 99 is adapted to receive the wires 79 and 80 of the spring assembly 76, such that the channel acts to retain the wires therein and thereby interconnect the pad and spring assembly. This arrangement is specifically shown in the inner spring mattress illustrated in FIG. 23, and the seat cushion illustrated in FIG. 27.

An alternate arrangement for forming the raised edge 67 along the periphery of the upper surface of the pad is illustrated in FIG. 13. In this embodiment, a cut strip 102 of foamed material is applied along the periphery of the material 46, with the channel 64 serving to guide the positioning of the strip thereon. The strip may be so positioned while the foaming operation is proceeding, in which case the tacky nature of the foaming material will self-adhere the strip thereto. Alternately, the strip may be joined thereto by means of a suitable adhesive after the foaming operation is completed. As seen in FIG. 20, the strip 102 may include a dense outer crust 103 along the inside surface thereof to serve as an insulator against the lateral movement of the spring assembly. The embodiment shown in FIG. 14 is generally similar to that described above, with the exception that a strip 104 of foamed material is applied along the periphery of the pad subsequent to the removal of the insert. In this case, a flame as shown schematically at 106 may be employed to melt the surface of the foam to permit self-adherence of the strip to the pad, or a suitable adhesive could be employed for this purpose. FIG. 24 illustrates an inner spring mattress formed by this procedure, while FIG. 28 illustrates a similarly formed seat cushion.

Foam pads produced in accordance with the present invention typically measure about 1½ to 2 inches in thickness at the center portion 58, and the edges 67 are about 2 to 3 inches in height and about 1½ to 2 inches in width. Also, the flanges 63 of the insert may be slightly tapered as shown in the drawings to facilitate removal thereof from the pad, thus resulting in a slightly tapered inwardly facing surface on the edge.

As noted above, the weight of the insert 60 may be varied by means of the removable weights 66 to control the height and density of the underlying foam. In this regard, it will be understood that the weight of the insert serves to retard expansion and densify the foam therebeneath while permitting the free expansion of the foam along the border within the channel 64. This free expansion may under certain conditions result in the formation of a raised edge of significant height, thereby eliminating or at least reducing the required amount of the additional foamable material 68.

The specific ingredients of the foaming material employed with the present invention are generally conventional, and may comprise a variety of well-known resin foaming compositions which are adapted to expand and cure in situ as it is poured into the mold and which is self-curing at room temperature and thus does not require any after treatment such as heating. A foam which meets the above requirements and which also produces a dense outer crust as described above is chemically blown urethane foam.

A specific non-limiting example of a suitable urethane foaming material is set forth below:

| Formulation | Parts By Weight |
| --- | --- |
| NIAX Polyol 11 – 34 (Union Carbide Corp.) | 60 |
| NIAX Polyol 34 – 28 (Union Carbide Corp.) | 40 |
| Water | 2.8 |
| NIAX Catalyst A-1 (Union Carbide Corp.) | 0.08 |
| NIAX Catalyst NEM (Union Carbide Corp.) | 0.8 |
| Solid DABCO (Houndry Process and Chemical Co.) | 0.08 |
| Silicone L-5305 (Union Carbide Corp.) | 1.5 |
| Dibutyltindilaurate | 0.03 |
| NIAX Isocyanates TDI/AFPI (Union Carbide Corp.) | 34.2 |
| Ratio | 80/20 |
| Index | 100 |

Niax Polyol 11 – 34 is a 5000 molecular weight polyether triol capped with ethylene oxide to give a very high primary hydroxyl content. Niax Polyol 34 – 28 is a polymer polyol, made by insitu polymerization of a vinyl containing monomer in a conventional polyol. Niax Catalyst A-1 is a 70% solution of bis (2-dimethylaminoethyl) ether in dipropylene glycol. Niax Catalyst NEM is N-ethyl morpholine. Solid DABCO is a powdered cyclic triethylene diamine. Niax Isocyanate TDI is toluene di-isocyanate. Niax Isocyanate AFPI is methylene bis-phenyl isocyanate. The resulting foam is relatively hard, and has a core density of about 2.48 pounds per cubic foot.

Foam pads produced in accordance with the above formulation can normally be demolded approximately 5 to 8 minutes after the mold filling operation. The following is a specific non-limiting example of a typical timing sequence for the various operation of the present invention:

a. The initial foamable material 46 is deposited in the mold 36.

b. Heat from the infrared lamps 57 is applied to the surface of the foaming material approximately 1½ minutes after the material has been deposited in the mold, and the heat is applied for approximately 1 minute to develope a thick crust.

c. After the heating operation is terminated, the insert 60 is applied and maintained on the rising foam material for approximately 2½ minutes.

d. The additional foamable material 68 is deposited in the channel 64 during the foaming of the initial material such that the foaming of the initial material and the additional material 68 occurs substantially concurrently.

e. Upon completion of foaming, the insert 60 is removed, and after a short additional cooling period, the pad 54 may be stripped from the mold.

Further details relating to the apparatus employed in the practice of the present invention may be obtained from applicant's copending application entitled "Apparatus for Fabricating Foam Pads", Ser. No. 478,617, and filed June 12, 1974.

In the drawings and specification, there has been set forth a preferred embodiment of the invention, and although specific terms are employed, they are used in a generic and descriptive sense only and not for purposes of limitation.

That which is claimed is:

1. A method of making a foam pad suitable for use in a seat, mattress, or the like comprising the steps of
    foaming in an open top mold a predetermined quantity of foamable elastomeric material capable of expanding and rising within the mold and forming resilient cellular pad having a dense upper crust on the upper surface thereof which is in contact with the surrounding air,
    leveling at least a major portion of the upper surface of the foaming material to substantially alleviate the inherent crowning of the foam and thereby define a substantially level central portion and while maintaining a substantial portion of the central portion of the foaming material in contact with the surrounding air to result in a dense upper crust being formed thereon, and including positioning an openwork mold insert having a generally planar lower surface so as to engage the upper surface of the foaming material, and
    forming a raised foam edge along the periphery of said upper surface.

2. The method as defined in claim 1 comprising the further step of removing the pad from the mold and mold insert.

3. The method as defined in claim 2 comprising the further subsequent steps of positioning a spring assembly on the pad such that the terminal portion along one face of the spring assembly rests upon the upper crust of said central portion and with the raised foam edge confiningly surrounding the spring assembly to prevent lateral shifting between the spring assembly and pad, and interconnecting the thus positioned spring assembly and pad to maintain the same in assembled relation.

4. The method as defined in claim 3 wherein the step of interconnecting the spring assembly and pad comprises positioning a fabric material to overlie the exposed side of the pad remote from the spring assembly, and securing the fabric material in a generally fixed relationship with respect to said spring assembly.

5. The method as defined in claim 4 comprising the further step of positioning an open mesh fabric on the foaming material so as to underlie the mold insert such that the mesh fabric becomes essentially embedded in the upper crust to thereby reinforce the same.

6. The method as defined in claim 5 comprising the further step of pre-securing the open mesh fabric to the lower surface of the mold insert such that the open mesh fabric and mold insert are positioned on the foaming material substantially concurrently.

7. The method as defined in claim 1 wherein the step of forming a raised foam edge includes positioning additional foamable material along the periphery of said upper surface and guidingly confining the additional foaming material as it rises upwardly.

8. The method as defined in claim 1 wherein the step of forming a raised foam edge includes adheringly securing a strip of foamed material along the periphery of said upper surface.

9. A method of making a foam pad suitable for use in a seat, mattress, or the like comprising the steps of
foaming in an open top mold having a predetermined peripheral outline a predetermined quantity of foamable elastomeric material capable of expanding and rising within the mold and forming a resilient cellular pad having a dense, tough upper crust on the upper surface thereof which is in contact with the surrounding air,
positioning an openwork mold insert having a generally planar lower surface and a peripheral outline somewhat smaller than that of said open top mold on the upper surface of the foaming material so as to be substantially floatingly carried thereon and such that a relatively narrow open channel is defined between the mold and mold insert, and wherein the mold insert serves to level the underlying portion of the upper surface while permitting air to contact a significant portion of the same to thereby result in a dense upper crust being formed thereon, and
forming a raised foam edge in the open channel and along the periphery of said upper surface.

10. The method as defined in claim 9 wherein the step of forming a raised foam edge includes depositing foamable material in the open channel such that the additional foamable material rises within the channel and self-adheres to the upper surface of the underlying material.

11. The method as defined in claim 10 wherein the peripheral outline of the mold insert is defined by an upstanding flange such that the additional foamable material is guided as it rises upwardly so as to form an inwardly facing surface, and including the further step of pre-securing an open mesh fabric along the lower surface and upstanding flange of the mold insert such that the open mesh fabric and mold insert are positioned on the foaming material substantially concurrently, and such that the open mesh fabric becomes essentially embedded in the crust of the upper surface and in the inwardly facing surface of the raised foam edge.

12. The method as defined in claim 10 wherein the peripheral outline of the mold insert is defined by an upstanding flange such that the additional foamable material is guided as it rises upwardly to form an inwardly facing surface, and wherein the upstanding flange of the mold insert comprises an openwork material such that a substantial portion of the area of the inwardly facing surface of the raised foam edge contacts the surrounding air as the additional foamable material rises within the channel so as to result in a dense upper crust being formed on said inwardly facing surface.

13. The method as defined in claim 9 comprising the further steps of
removing the pad from the mold and mold insert;
positioning a spring assembly on the pad such that the terminal portion along one face of the spring assembly rests upon the crust of the upper surface and with the raised foam edge confiningly surrounding the spring assembly to prevent lateral shifting between the spring assembly and pad, and interconnecting the thus positioned spring assembly and pad.

14. A method of making foam pads suitable for use in a seat, mattress, or the like comprising the steps of
conveying a plurality of open top molds having a predetermined peripheral outline about an endless path of travel,
depositing a predetermined quantity of foamable elastomeric material in each mold as the same passes a predetermined filling station located along said path of travel, said foamable elastomeric material being capable of expanding and rising within the mold and forming a resilient cellular pad having a dense, tough upper crust on the upper surface thereof which is in contact with the surrounding air,
positioning an openwork mold insert on the upper surface of the foaming material in each mold so as to be substantially floatingly carried thereon as the mold passes a predetermined assembly station located downstream of said filling station, said mold insert having a generally planar lower surface and a peripheral outline somewhat smaller than that of said open top mold such that a relatively narrow open channel is defined between the mold and mold insert, and wherein said mold insert is free to rise upwardly with the foaming material and serves to level the underlying portion of the upper surface while permitting air to contact a significant portion of the same to thereby result in a dense upper crust being formed thereon,
depositing additional foamable material in the open channel of each mold as the mold passes a predetermined edge forming station located downstream of said assembly station to thereby form a raised foam edge along the periphery of said upper surface, and
removing the resulting pad from the mold and mold insert at a removal station located downstream of said edge forming station.

15. The method as defined in claim 14 comprising the further step of applying heat from infrared lamps to the upper surface of the foaming material of each mold as the mold passes a predetermined heating station located between said filling station and assembly station to thereby result in the formation of a crust of additional thickness on the upper surface of the foaming material.

16. A method of making a foam pad suitable for use in a seat, mattress, or the like comprising the steps of
foaming in an open top mold having a predetermined peripheral outline a predetermined quantity of foamable elastomeric material capable of expanding and rising within the mold and forming a resilient cellular pad having a dense, tough upper crust on the upper surface thereof which is in contact with the surrounding air,
increasing the thickness of the crust by applying heat to the upper surface of the foaming material,
leveling at least a major portion of the upper surface of the foaming material to substantially alleviate the inherent crowning of the foam and thereby define a substantially level central portion, and
forming a raised foam edge along the periphery of said upper surface.

17. The method as defined in claim 16 wherein the step of leveling the upper surface includes permitting air to reach at least about 75% of the underlying upper surface of the foaming material to facilitate the formation of a dense upper crust thereon.

18. The method as defined in claim 17 wherein the step of leveling the upper surface further includes positioning a mold insert having a generally planar openwork lower surface in substantially floating relationship on the upper surface of the foaming material.

* * * * *